US009615030B2

(12) United States Patent
Attar et al.

(10) Patent No.: US 9,615,030 B2
(45) Date of Patent: Apr. 4, 2017

(54) LUMINANCE SOURCE SELECTION IN A MULTI-LENS CAMERA

(71) Applicant: LinX Computational Imaging Ltd., Caesarea (IL)

(72) Inventors: Ziv Attar, Zihron Yaakov (IL); Chen Aharon-Attar, Zihron Yaakov (IL)

(73) Assignee: LinX Computational Imaging Ltd., Zichron Yaakov (IL)

( * ) Notice: Subject to any disclaimer, the term of this patent is extended or adjusted under 35 U.S.C. 154(b) by 0 days.

(21) Appl. No.: 15/231,634

(22) Filed: Aug. 8, 2016

(65) Prior Publication Data
US 2016/0344915 A1    Nov. 24, 2016

Related U.S. Application Data

(63) Continuation of application No. 13/881,124, filed as application No. PCT/NL2011/050725 on Oct. 24, 2011, now Pat. No. 9,413,984.
(Continued)

(51) Int. Cl.
*H04N 5/235* (2006.01)
*H04N 5/225* (2006.01)
(Continued)

(52) U.S. Cl.
CPC ......... *H04N 5/2351* (2013.01); *H04N 5/2253* (2013.01); *H04N 5/2254* (2013.01);
(Continued)

(58) Field of Classification Search
CPC .... H04N 5/2351; H04N 5/2253; H04N 9/045; H04N 5/23232; H04N 5/265; H04N 5/2254
See application file for complete search history.

(56) References Cited

U.S. PATENT DOCUMENTS

| 4,890,905 A | 1/1990 | VanRosmalen |
| 5,347,340 A | 9/1994 | Tsukada |

(Continued)

FOREIGN PATENT DOCUMENTS

| EP | 1206126 A2 | 5/2002 |
| EP | 2336816 A2 | 6/2011 |

(Continued)

OTHER PUBLICATIONS

Horisaki, R. et al., "A Compound-Eye Imaging System with Irregular Lens-Array Arrangement," Proceedings of SPIE, Optics and Photonics for Information Processing II, Awwal, A.A.S. et al. (eds.), Aug. 13-14, 2008, p. 70720G1-70720G-1, vol. 7072.

(Continued)

*Primary Examiner* — Aung S Moe
(74) *Attorney, Agent, or Firm* — Blank Rome LLP

(57) ABSTRACT

The luminance information of an image captured by a multi-lens camera system can be improved by selecting a luminance information source for each portion of the captured image. Each lens of the camera system can capture an initial image. For each portion of a final image, a corresponding initial image portion can be selected as the luminance information source. The portions of the final image and initial images can be pixels, groups of pixels, or other image portions. The luminance information from the selected initial image portions is combined to form final image luminance information. Chrominance information can also be selected from the initial images to form final image chrominance information, and the final image chrominance information and the final image luminance information can be combined to form a final image.

20 Claims, 6 Drawing Sheets

Related U.S. Application Data

(60) Provisional application No. 61/406,148, filed on Oct. 24, 2010.

(51) Int. Cl.
  *H04N 5/232* (2006.01)
  *H04N 5/265* (2006.01)
  *H04N 9/04* (2006.01)

(52) U.S. Cl.
  CPC ......... *H04N 5/23232* (2013.01); *H04N 5/265* (2013.01); *H04N 9/045* (2013.01)

(56) References Cited

U.S. PATENT DOCUMENTS

| | | | |
|---|---|---|---|
| 6,115,065 A | 9/2000 | Yadid-Pecht | |
| 6,765,617 B1 | 7/2004 | Tangen | |
| 6,773,638 B2 | 8/2004 | Kloosterboer | |
| 6,809,766 B1 | 10/2004 | Krymski | |
| 6,898,331 B2 * | 5/2005 | Tiana | G06T 5/50 345/617 |
| 6,980,248 B1 * | 12/2005 | Suda | H04N 5/2254 348/335 |
| 7,151,259 B2 | 12/2006 | Koch | |
| 7,199,348 B2 | 4/2007 | Olsen | |
| 7,224,384 B1 | 5/2007 | Iddan | |
| 7,233,359 B2 * | 6/2007 | Suda | H04N 5/23212 348/335 |
| 7,262,799 B2 * | 8/2007 | Suda | H04N 9/093 348/263 |
| 7,564,019 B2 | 7/2009 | Olsen | |
| 7,620,309 B2 | 11/2009 | Georgiev | |
| 7,718,940 B2 | 5/2010 | Hirasawa | |
| 7,916,181 B2 | 3/2011 | Nilehn | |
| 7,932,941 B2 | 4/2011 | Hayasaka | |
| 8,023,016 B2 | 9/2011 | Iijima | |
| 8,049,806 B2 | 11/2011 | Feldman | |
| 8,228,417 B1 * | 7/2012 | Georgiev | G03B 11/00 348/335 |
| 8,259,212 B2 * | 9/2012 | Brady | G02B 3/0056 348/335 |
| 8,290,358 B1 | 10/2012 | Georgiev | |
| 8,315,476 B1 * | 11/2012 | Georgiev | H04N 5/23232 348/207.99 |
| 8,345,144 B1 * | 1/2013 | Georgiev | G03B 11/00 348/335 |
| 8,436,909 B2 | 5/2013 | Farina | |
| 8,471,920 B2 * | 6/2013 | Georgiev | G03B 11/00 348/221.1 |
| 8,514,491 B2 * | 8/2013 | Duparre | H01L 27/14621 359/443 |
| 8,611,693 B2 * | 12/2013 | Intwala | G06T 5/10 382/254 |
| 8,629,390 B2 | 1/2014 | Olsen | |
| 8,749,694 B2 * | 6/2014 | Georgiev | H04N 9/045 348/335 |
| 8,760,558 B2 * | 6/2014 | Morita | G02B 3/0043 348/335 |
| 8,817,015 B2 | 8/2014 | Georgiev | |
| 8,885,059 B1 | 11/2014 | Venkataraman | |
| 2001/0026322 A1 | 10/2001 | Takahashi | |
| 2002/0067416 A1 | 6/2002 | Yoneda | |
| 2002/0089596 A1 | 7/2002 | Suda | |
| 2002/0122124 A1 * | 9/2002 | Suda | H04N 9/093 348/263 |
| 2003/0108240 A1 | 6/2003 | Gutta | |
| 2003/0234907 A1 | 12/2003 | Kawai | |
| 2004/0047518 A1 | 3/2004 | Tiana | |
| 2004/0080661 A1 | 4/2004 | Afsenius | |
| 2004/0109004 A1 | 6/2004 | Bastos | |
| 2004/0201748 A1 | 10/2004 | Goldstein | |
| 2005/0052751 A1 | 3/2005 | Liu | |
| 2005/0128323 A1 * | 6/2005 | Choi | G03B 29/00 348/239 |
| 2005/0128335 A1 | 6/2005 | Kolehmainen | |
| 2005/0128509 A1 | 6/2005 | Tokkonen | |
| 2005/0134699 A1 * | 6/2005 | Nagashima | G02B 13/0055 348/218.1 |
| 2005/0160112 A1 | 7/2005 | Makela | |
| 2005/0225654 A1 | 10/2005 | Feldman | |
| 2005/0259169 A1 | 11/2005 | Ito | |
| 2005/0270395 A1 | 12/2005 | Yoneda | |
| 2006/0003328 A1 | 1/2006 | Grossberg | |
| 2006/0055811 A1 | 3/2006 | Frtiz | |
| 2006/0108505 A1 | 5/2006 | Gruhlke | |
| 2006/0125936 A1 | 6/2006 | Gruhike | |
| 2006/0193509 A1 | 8/2006 | Criminisi | |
| 2007/0075218 A1 | 4/2007 | Gates | |
| 2007/0091197 A1 | 4/2007 | Okayama | |
| 2007/0153086 A1 | 7/2007 | Usui | |
| 2007/0177004 A1 | 8/2007 | Kolehmainen | |
| 2007/0189748 A1 | 8/2007 | Drimbarean | |
| 2007/0211164 A1 | 9/2007 | Olsen | |
| 2007/0252074 A1 | 11/2007 | Ng | |
| 2007/0252908 A1 | 11/2007 | Kolehmainen | |
| 2007/0258006 A1 | 11/2007 | Olsen | |
| 2008/0068452 A1 | 3/2008 | Nakao | |
| 2008/0079839 A1 | 4/2008 | Sung | |
| 2008/0084486 A1 | 4/2008 | Enge | |
| 2008/0218611 A1 | 9/2008 | Parulski | |
| 2008/0219493 A1 | 9/2008 | Tadmor | |
| 2008/0240508 A1 | 10/2008 | Nakao | |
| 2008/0278610 A1 | 11/2008 | Boettiger | |
| 2009/0021612 A1 | 1/2009 | Hamilton | |
| 2009/0103792 A1 | 4/2009 | Rahn | |
| 2009/0140131 A1 | 6/2009 | Utagawa | |
| 2009/0262987 A1 | 10/2009 | Ioffe | |
| 2009/0321861 A1 | 12/2009 | Oliver | |
| 2010/0020078 A1 | 1/2010 | Shpunt | |
| 2010/0021064 A1 | 1/2010 | Lee | |
| 2010/0039713 A1 | 2/2010 | Lusinchi | |
| 2010/0052192 A1 | 3/2010 | Hasegawa | |
| 2010/0085468 A1 | 4/2010 | Park | |
| 2010/0097491 A1 * | 4/2010 | Farina | H04N 9/045 348/223.1 |
| 2010/0117176 A1 | 5/2010 | Uekawa | |
| 2010/0127157 A1 | 5/2010 | Tamaki | |
| 2010/0128137 A1 | 5/2010 | Guidash | |
| 2010/0171866 A1 | 7/2010 | Brady | |
| 2010/0253833 A1 | 10/2010 | Deever | |
| 2010/0259607 A1 | 10/2010 | Kennedy | |
| 2010/0283837 A1 | 11/2010 | Oohchida | |
| 2011/0019048 A1 | 1/2011 | Raynor | |
| 2011/0069189 A1 * | 3/2011 | Venkataraman | H01L 27/14618 348/218.1 |
| 2011/0080487 A1 | 4/2011 | Venkataraman | |
| 2011/0122308 A1 | 5/2011 | Duparre | |
| 2011/0134282 A1 * | 6/2011 | Morita | G02B 3/0043 348/234 |
| 2011/0157387 A1 * | 6/2011 | Han | H04N 5/2253 348/218.1 |
| 2011/0242356 A1 | 10/2011 | Aleksic | |
| 2012/0007942 A1 | 1/2012 | Michrowski | |
| 2012/0140100 A1 | 6/2012 | Shibazaki | |
| 2013/0002928 A1 * | 1/2013 | Imai | H04N 5/23216 348/333.11 |
| 2013/0121615 A1 * | 5/2013 | Intwala | G06T 5/10 382/280 |
| 2013/0128087 A1 * | 5/2013 | Georgiev | H04N 5/2254 348/307 |
| 2013/0293744 A1 * | 11/2013 | Attar | H04N 5/2226 348/234 |
| 2013/0308197 A1 | 11/2013 | Duparre | |
| 2013/0321674 A1 * | 12/2013 | Cote | H04N 9/64 348/242 |
| 2013/0335598 A1 | 12/2013 | Gustavsson | |
| 2013/0335621 A1 * | 12/2013 | Attar | H04N 5/2226 348/360 |
| 2015/0234151 A1 | 8/2015 | Venkataraman | |

(56) References Cited

U.S. PATENT DOCUMENTS

| | | | |
|---|---|---|---|
| 2015/0235371 A1 | 8/2015 | Venkataraman |
| 2015/0296193 A1 | 10/2015 | Cote |

FOREIGN PATENT DOCUMENTS

| | | | |
|---|---|---|---|
| JP | 2000152281 A | 5/2000 |
| JP | 2001078212 A | 3/2001 |
| JP | 2002135795 A | 5/2002 |
| JP | 2002171430 A | 6/2002 |
| JP | 2005109622 A | 4/2005 |
| JP | 2005303694 A | 10/2005 |
| JP | 2006246193 A | 9/2006 |
| JP | 2007158825 A | 6/2007 |
| JP | 2008099329 A | 4/2008 |
| JP | 2010004090 A | 1/2010 |
| JP | 2011109484 A | 6/2011 |
| WO | 0022566 A1 | 4/2000 |
| WO | 03049035 A2 | 6/2003 |
| WO | 2004021264 A1 | 3/2004 |
| WO | 2004027880 A2 | 4/2004 |
| WO | 2006039486 A2 | 4/2006 |
| WO | 2007005714 A2 | 1/2007 |
| WO | 2008085679 A1 | 7/2008 |
| WO | 2008087652 A2 | 7/2008 |
| WO | 2009123278 A1 | 10/2009 |
| WO | 2009151903 A2 | 12/2009 |
| WO | 2010059182 A1 | 5/2010 |
| WO | 2010078563 A1 | 7/2010 |

OTHER PUBLICATIONS

Horstmeyer, R. et al., "Flexible Multimodal Camera Using a Light Field Architecture," 2009 IEEE International Conference on Computational Photography (ICCP2009), IEEE, Apr. 16, 2009, pp. 1-8.
Mirotznik, M. et al., "A Practical Enhanced-Resolution Integrated Optical-Digital Imaging Camera," Proceedings of SPIE, Modeling and Simulation for Military Operation IV, Trevisani, D.A. (ed.), Jan. 2009, pp. 743806-1-743806-9, vol. 7348.

* cited by examiner

LUMINANCE SOURCE SELECTION IN A MULTI-LENS CAMERA

CROSS REFERENCE TO RELATED APPLICATIONS

This application is a continuation of U.S. patent application Ser. No. 13/881,124, filed on Jul. 8, 2013, which in turn is a national phase application of PCT/NL2011/050725, entitled "System and Method for Imaging Using Multi Aperture Camera," filed on Oct. 24, 2011, which in turn claims priority to U.S. Provisional Application No. 61/406,148, filed on Oct. 24, 2010, the contents of which are all hereby incorporated by reference in their entirety.

BACKGROUND

1. Technical Field

This disclosure relates to a camera system, and more specifically, to a multi-lens camera system configured to select between sources of luminance information in generating an image.

2. Description of the Related Art

An imaging system typically consists of an imaging lens and an image sensor. An imaging lens collects light emitted or reflected from objects in a scene and directs collected light upon the image sensor. An image sensor is a photosensitive device that converts light incident upon the image sensor during an image capture to an electronic signal representative of the captured light. To obtain color image data, a color filter array (such as a Bayer filter) is used in conjunction with the image sensor to separate between different spectral regions of the total light spectrum of the image being captured. Color filter arrays separate captured light into (for instance) green image planes, red image planes, and blue image planes.

Given an image sensor's active area dimension (the image sensor's "format") and the desired field of view, the focal length of a lens can be calculated. The size of the aperture of the lens can be set according to image sensor's photo sensitivity, exposure time, and noise level tolerance. The focal length divided by the aperture's size is called the "F-number," and indicates the ability of the lens to collect light. Lower F-Numbers are associated with more light being collected by the lens and directed upon the image sensor.

A phenomena caused by the use of color filter arrays is the appearance of color artifacts also caused by the spatial disposition of the different colors. For example, in a captured image of a white line 1 pixel deep on a black background, the white line will appear in various colors depending on the position of the light from the line incident upon the image sensor. Multi-lens systems can be implemented to reduce such artifacts, but can be accompanied by issues of increased system cost and complexity.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
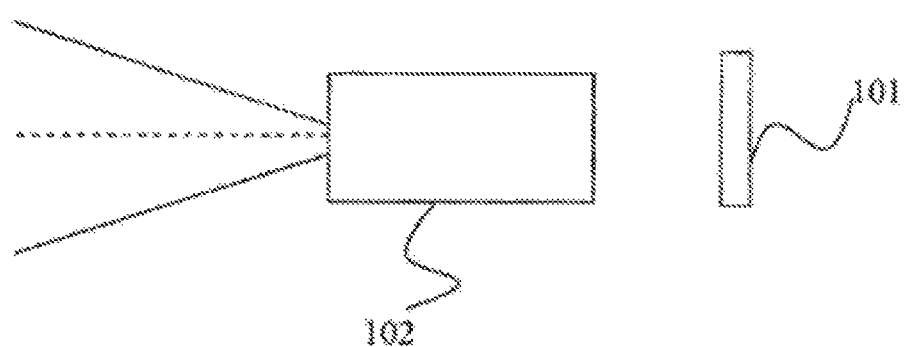
FIG. 1 illustrates a side view of a single lens camera, according to one example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A multi-lens camera system can improve image luminance by, for each image portion of a field of view, selecting one of the lenses as a source for luminance information for the portion of the field of view. One or more image sensors can be divided into a plurality of image sensor regions, each associated with a different lens. Each lens collects light from the field of view and directs the collected light onto an image sensor region. Each image sensor region captures an initial image representing the light incident upon the image sensor region from an associated lens, and the camera system can combine the initial images to create a final image.

The field of view can be divided into a plurality of portions (such as pixels), and each field of view portion can be associated with an image sensor region portion of each image sensor region. For example, the field of view can be divided into 100 by 100 pixels, and each image sensor region can capture an initial image measuring 100 by 100 pixels, with a 1-to-1 correspondence between each field of view pixel and an associated initial image pixel for each captured initial image. The final image generated by the camera system can include a plurality of portions corresponding to the plurality of field of view portions and the associated plurality of image sensor region portions. The source of luminance information for each final image portion can be selected from among the plurality of associated initial image portions. Continuing with the previous example, if the final image is 100 by 100 pixels, the luminance information for each final image pixel can be selected from among the plurality of associated initial image pixels. By selecting the source of luminance information for each final image portion, the final image can have higher dynamic range and better low light performance than any of the initial images captured by the camera system.

Luminance Source Selection Overview

The multi-lens camera system described herein can improve the effective resolution and spatial resolution of a captured image while improving the low light performance and increasing the dynamic range of the camera system. Each lens in the multi-lens camera system is associated with one or more optical surfaces having a non-zero optical power. For a spatial resolution of f, each lens can resolve image details of the size 1/f.

As noted above, each lens of the multi-lens camera system collects light from a field of view and directs the light onto an image sensor region. The image sensor region captures light incident upon the image sensor region from an associated lens to form an initial image. The multi-lens camera system can generate a final image based at least in part on the combination of image information from one or more of the initial images. The final image can be generated by selecting, for each final image portion, luminance information from one of the plurality of associated initial image portions.

The multi-lens camera system can include one or more color filters, polarized filters, chromatic filters, and neutral density filters integrated within the system configured to filter collected light prior to capture by the image sensor. Each initial image can have a different light intensity from other initial images. The camera system can include an algorithm for adding initial images to form a final image having higher dynamic range than the initial images. Each lens in the multi-lens camera system can have a different F-Number than the other lenses, and can be focused to a different distance than the other lenses.

In one embodiment, selecting the source of luminance information for each final image portion includes selecting the sharpest initial image portion associated with the final image portion from among the initial portions. As noted above, the final image portions and initial image portions can be single pixels. Thus, selecting the luminance information for a final image portion can include selecting an associated initial image pixel from among the initial images for a final image pixel. The source of luminance information for any two final image pixels can be different initial images or the same initial image. In addition to selecting the source of luminance information at the pixel level, the source of luminance information can be selected for pixel groups, or for any image portion according to the principles described herein.

Selecting luminance information for the final image at the pixel level can beneficially allow for maximizing the signal to noise ratio for dark image portions and avoiding saturation at bright image portions, particularly at image portions including borders between bright areas and dark area. Selecting luminance information at the pixel group level can beneficially reduce computation time in generating the final image. Computation time can be further reduced by performing edge detection on the initial images, and selecting pixel groups based on the detected edges.

The lenses of the multi-camera system can be focused at the same distance or at different distances, and can have the same field of view or different fields of view. Further, each lens can include various different filters, and the image sensor regions associated with the lenses can be exposed at different times or the same time, or for different intervals of time or the same interval of time. By adjusting the parameters of each lens and the image sensor region exposures, the dynamic range of the final image can be increased, the white balance of the final image can be better controlled, and the low light performance of the camera system can be increased. In one embodiment, luminance information is chosen for dark areas of the final image from an initial image associated with a lens with a broader spectral filter, and for light areas of the final image from other image sensor regions. This can allow for choosing the source of luminance from initial images that are not saturated, further increasing the dynamic range of the final image.

The multi-lens camera system described herein can perform a method for selecting a source of luminance information for each pixel in a final image, including the steps:

1. for each pixel in a final image, comparing the luminance information of a set of corresponding pixels from a plurality of initial images, 2. for each pixel in the final image, selecting a pixel from the set of corresponding pixels as a source of luminance information for the pixel of the final image based on the comparisons, 3. combining the luminance information from the selected pixels to form final image luminance information, 4. selecting chrominance information from each of the initial images to form final image chrominance information, and 5. combining the final image luminance information and the final image chrominance information to form the final image.

System Overview

The system and method described herein provide high quality imaging while considerably reducing the length of the camera as compared to other systems and methods.

Figure 2:
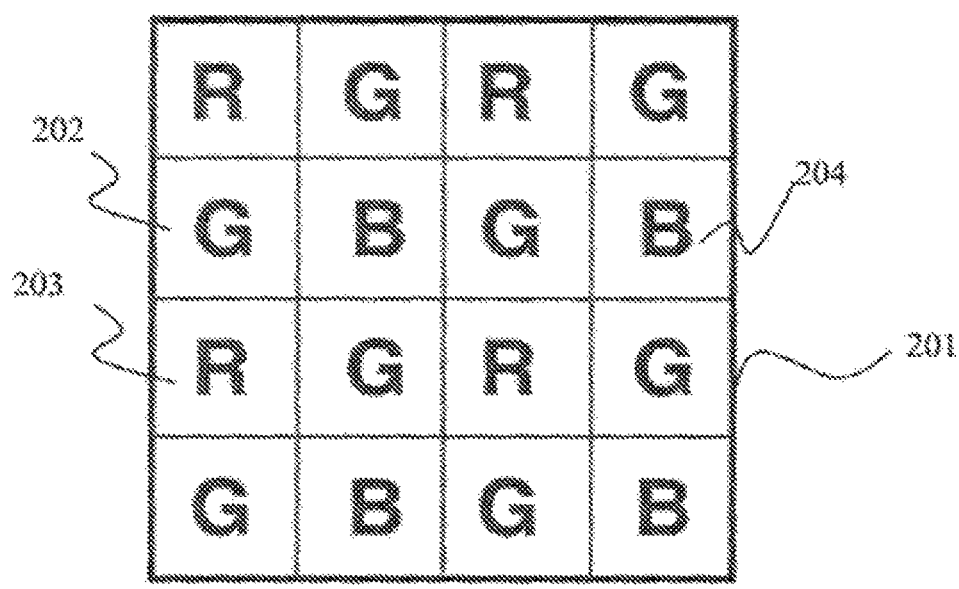
FIG. 2 illustrates a color filter array having multiple pixels, according to one example embodiment.

FIG. 1 illustrates a side view of a single lens camera having a single lens (102) that can include one or more elements and a single sensor (101). FIG. 2 illustrates a sensor array (201) having multiple pixels where the position of the green filter, red filter and blue filter are marked by (202), (203) and (204) respectively. The image that will be taken using this configuration needs to be processed in order to separate the green, red and blue images.

Figure 3:
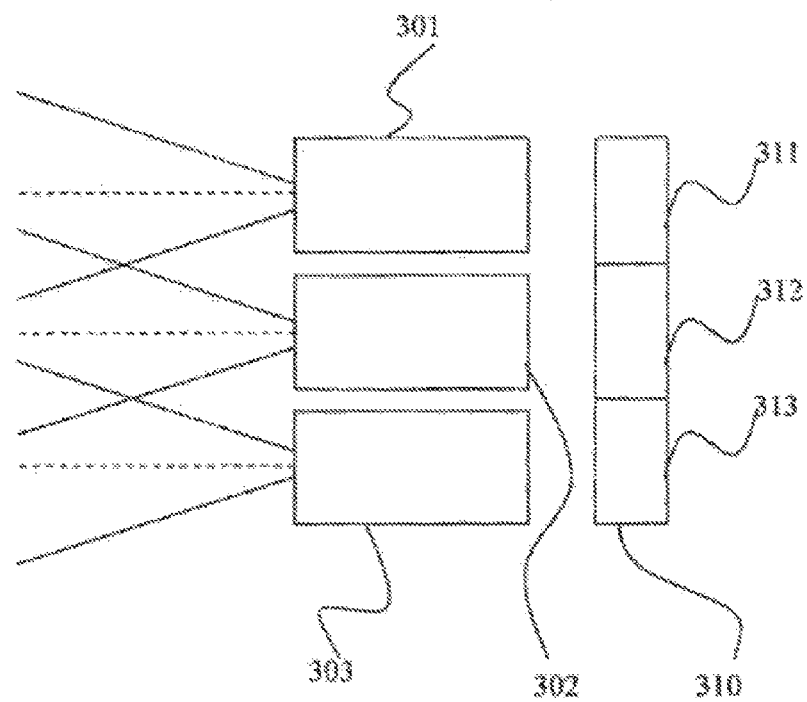
FIG. 3 illustrates a side view of a three lens camera having one image sensor and three lenses, according to one example embodiment.

FIG. 3 illustrates a side view of a three lens camera having one sensor (310) and three lenses (301), (302) and (303). Each one of the said lens will project the image of the same scene on to segments of the sensor marked by (311), (312), and (313) respectively. Each one of the three lenses will have different color filters integrated within the lens, in front of it or between the lens and sensor (310). Using the described configuration the image acquired by the sensor will be composed of two or more smaller images, each imaging information from the scene at different spectrums.

Figure 4:
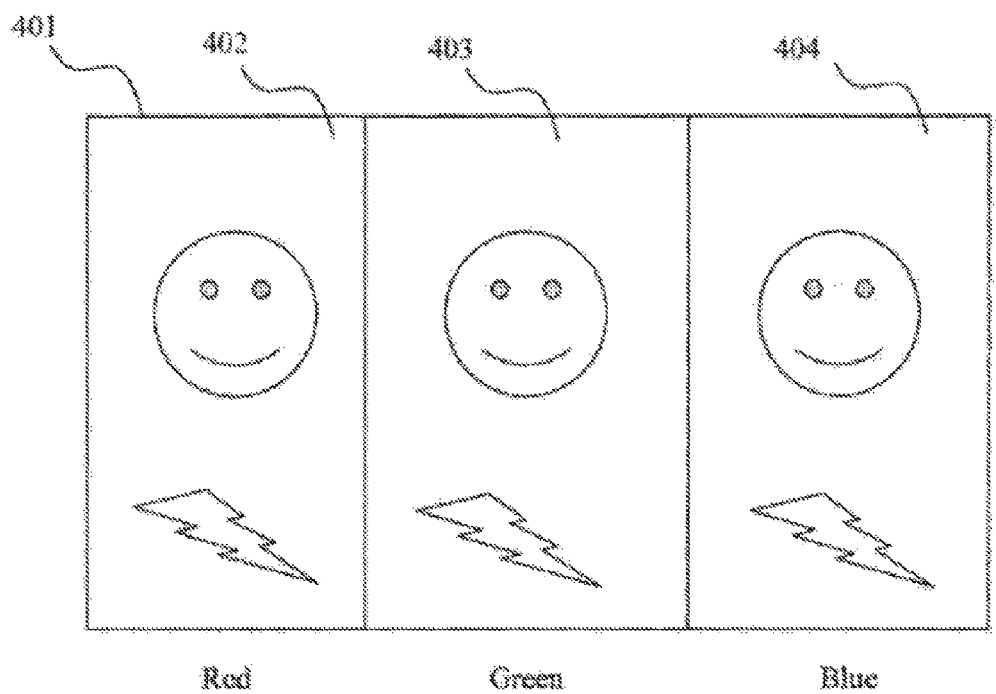
FIG. 4 illustrates an example of a scene as projected on to an image sensor, according to one example embodiment.

FIG. 4 illustrates an example of a scene as projected on to the sensor (401), in each region of the sensor (402), (403) and (404) the same scene is projected but each region will contain information for light at different wavelengths representing different colors according to the filters integrated within the lens that forms the image on each region.

The described configuration does not require the use of a color filter array and therefore the maximal spatial frequency that can be resolved by the sensor can be higher. On the other hand, using smaller lens and smaller active area per channel can result in a smaller focal length of the lens. Therefore, the spatial resolution of objects can be decreased, and the maximal resolvable resolution for each color can remain the same.

The image acquired by the sensor is composed of two or more smaller images, each containing information of the same scene but in different colors. The complete image is then processed and separated in to 3 or more smaller images and combined together to one large color image.

The described method of imaging has many advantages:

1. Shorter lens track (height): Each one of the lenses used can be smaller in size than the single lens covering the same field of view. The total track (height) of each lens can be smaller, allowing the camera to be smaller in height, an important factor for mobile phone cameras, notebook cameras and other applications requiring short optical track.

2. Reduced Color artifacts: Since each color is captured separately, artifacts originating from spatial dependency of each color in a color filter array can be reduced.

3. Lens requirements: Each lens does not have to be optimal for all spectrums used, simplifying the lens design and possibly decreasing the amount of elements used in each lens as no color correction may be needed.

4. Larger Depth of Focus: The depth of focus of a system depends on its focal length. Since smaller lenses are used with smaller focal lengths, the depth of focus is increased by the scale factor, squared.

5. Elimination of focus mechanism: Focus mechanisms can change the distance between the lens and the sensor to compensate for the change in object distance and to assure that the desired distance is in focus during the exposure time. Such a mechanism can be costly and can have many other disadvantages such as increased size, increased power consumption, shutter lag, decreased reliability, and increased price.

Using a fourth lens in addition to the three used for each color red, green and blue (or other colors) with a broad spectral transmission can allow extension of the sensor's dynamic range and can improve the signal-to-noise performance of the camera in low light conditions.

All configurations described above using a fourth lens element can be applied to configurations having two or more lenses.

Another configuration uses two or more lenses with one sensor having a color filter array integrated or on top of the sensor such as a Bayer filter array. In such a configuration no color filter will be integrated in to each lens channel and all lenses will create a color image on the sensor region corresponding to the specific lens. The resulting image will be processed to form one large image combining the two or more color images that are projected on to the sensor.

Dividing the sensor's active area in to 3 areas, one for each of red, green, and blue (for example), can be achieved by placing 3 lenses as illustrated in the figures. The resulting image will include 3 small images containing information of the same scene in a different color.

Figure 5:
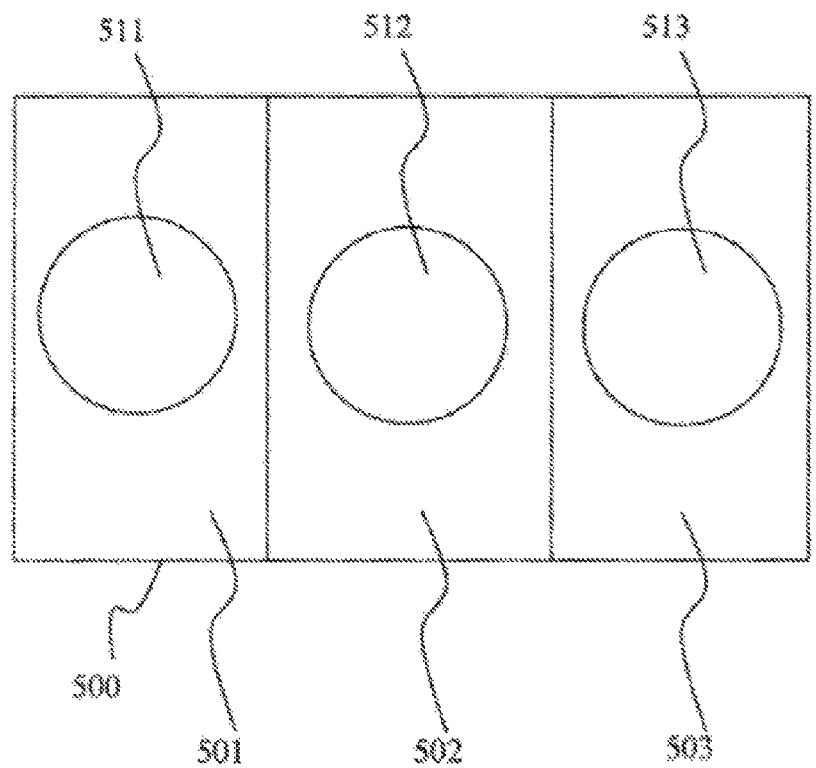
FIG. 5 illustrates a front view of a three lens camera using one rectangular image sensor divided in to three regions, according to one example embodiment.

FIG. 5 illustrates a front view of a three lens camera using one rectangular sensor (500) divided in to three regions (501), (502) and (503). The three lenses (511), (512) and (513) each having different color filters integrated within the lens, in front of the lens or between the lens and the sensor are used to form an image of the same scene but in different colors. In this example each region of the sensor (501), (502) and (503) are rectangular having the longer dimension of the rectangle perpendicular to the long dimension of the complete sensor.

Other three lens configuration can be used, such as using a larger green filtered lens and two smaller lenses for blue and red, such a configuration will results in higher spatial resolution in the green channel since more pixels are being used.

Figure 6:
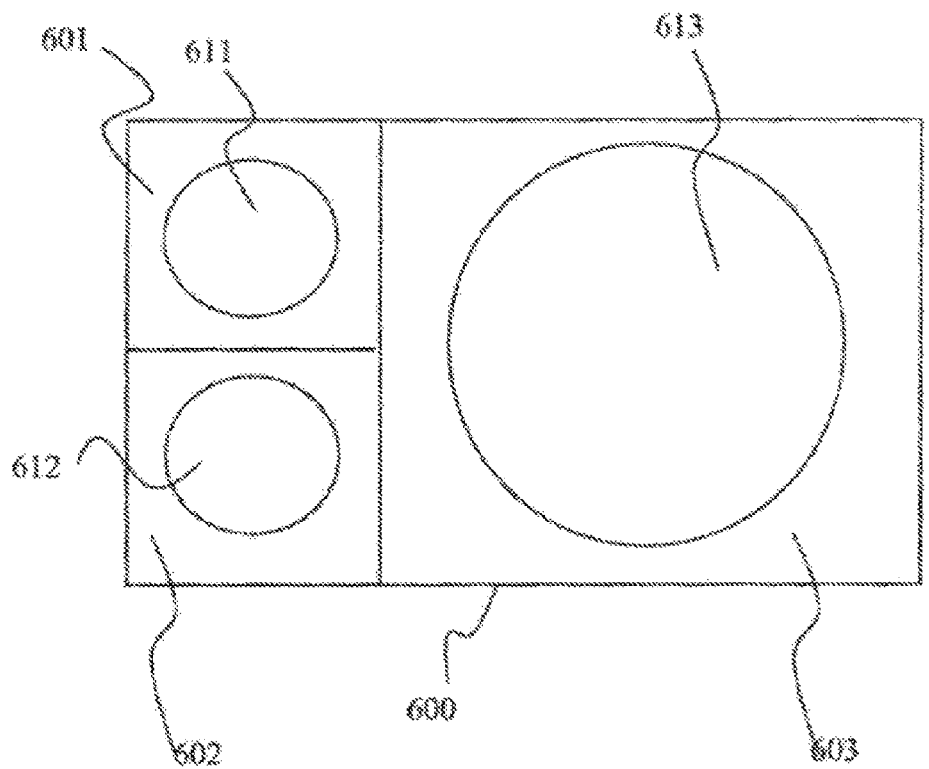
FIG. 6 illustrates a front view of a three lens camera having one image sensor, one large lens and two smaller lenses, according to one example embodiment.

FIG. 6 illustrates a front view of a three lens camera having one sensor (600), one large lens (613) and two smaller lenses (611) and (612). The large lens (613) is used to form an image on the sensor segment marked (603) while the two smaller lenses form an image on the sensor's segments marked with (601) and (602) respectively. The larger lens (613) can use a green color filter while the two smaller lenses (611) and (612) can use a blue and red filter respectively. Other color filters could be used for each lens.

A four lens camera includes 4 lenses each having a different color filter integrated within the lens, in front of the lens, or between the lens and the sensor region corresponding to the lens. The color filter used for two lenses can be the same, resulting in a particular color filter appearing twice among the 4 lenses.

Figure 7:
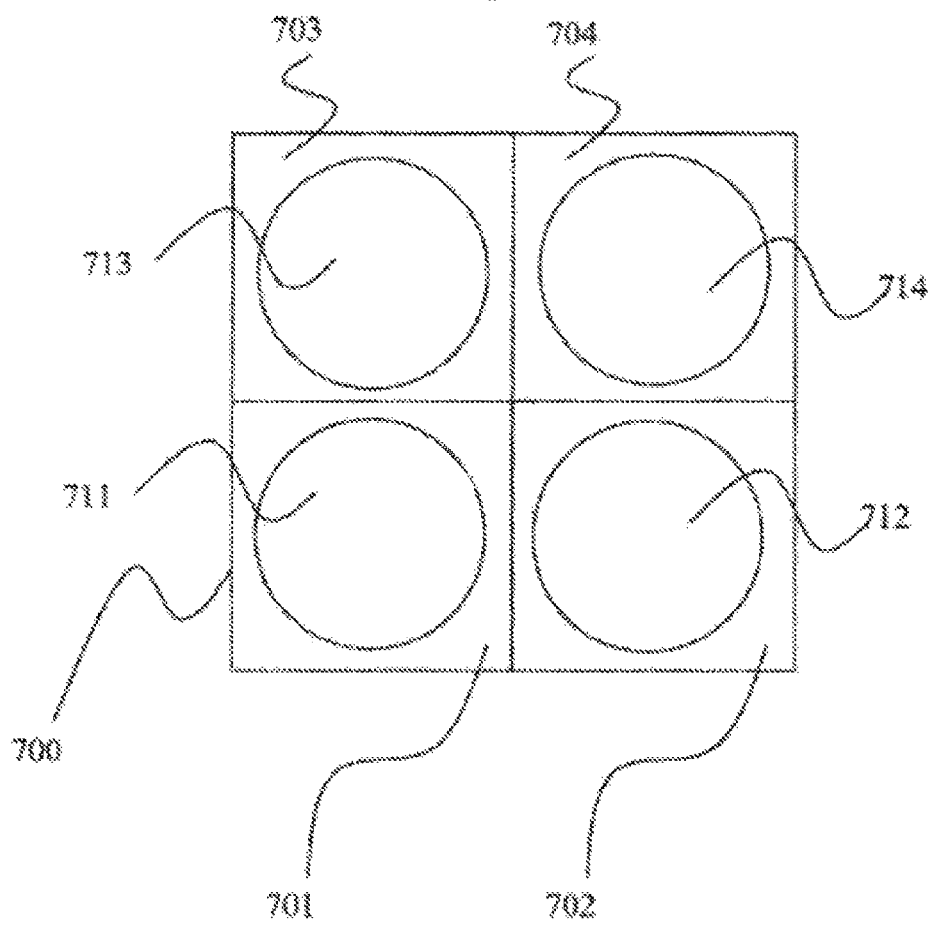
FIG. 7 illustrates a front view of a four lens camera having a one image sensor and four lenses, according to one example embodiment.

FIG. 7 illustrates a front view of a four lens camera having one sensor (700) and four lenses (711), (712),(713) and (714). Each lens forms an image on the corresponding sensor region marked with (701), (702),(703) and (704) respectively. Each one of the lenses will be integrated with a color filter within the lens, in front of the lens, or between the lens and the sensor. All four lenses can be integrated with different color filters, or two of the four lenses can be integrated with the same color filter. For example, two green filters, one blue filter, and one red filter can allow more light collection in the green spectrum.

Figure 8:
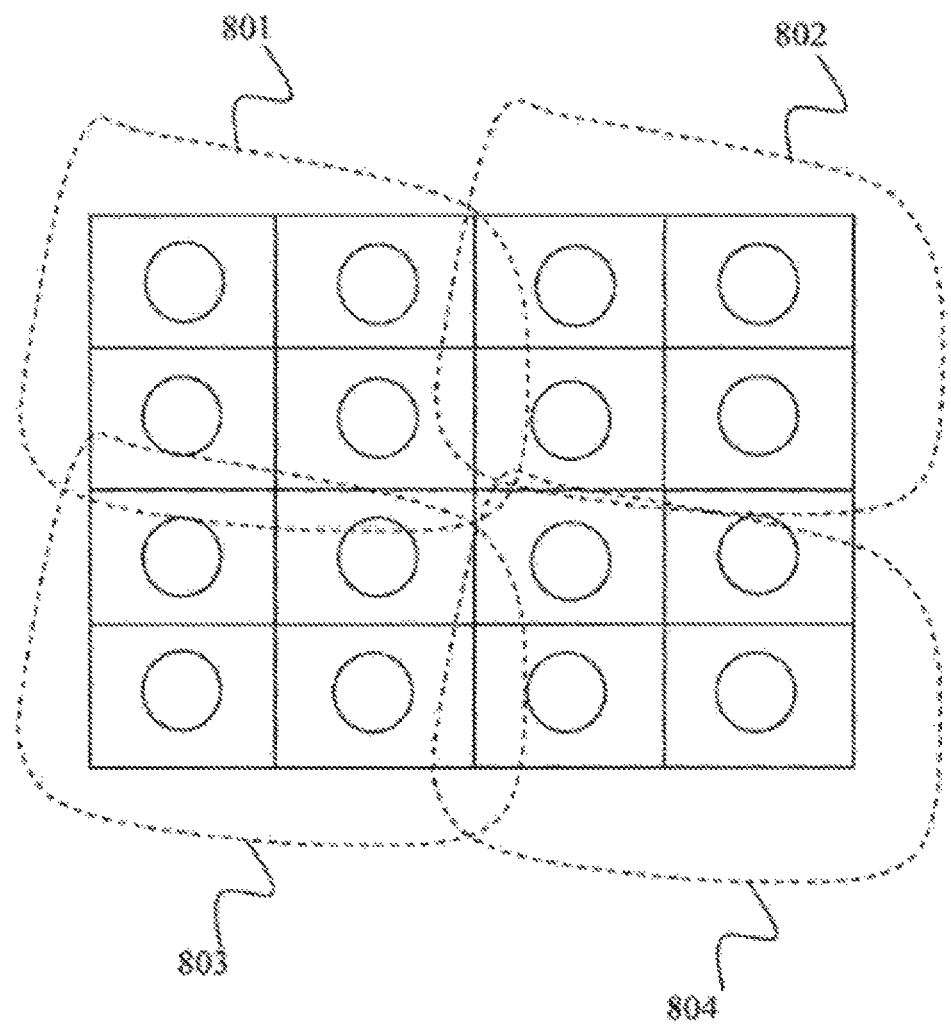
FIG. 8 illustrates a 16 lens camera having four regions, each containing four lenses as illustrated in FIG. 7, according to one example embodiment.

FIG. 8 illustrates a 16 lens camera having 4 regions (801), (802), (803) and (804), each containing four lenses as illustrated in FIG. 7.

Figure 9:
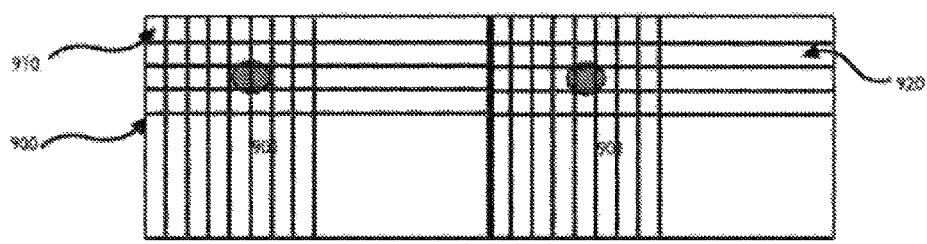
FIG. 9 illustrates a light source incident upon two image sensor regions, according to one example embodiment.

FIG. 9 illustrates a light source 901 incident upon an image sensor 900 including two image sensor regions 910 and 920. The light source 901 is primarily incident upon two pixels of the image sensor region 910, and upon one pixel of the image sensor region 920. Accordingly, the sharpness of the light source in the initial images captured by the image sensor regions 910 and 920 is greater in the pixel of the initial image captured by the image sensor region 920 than in either of the two pixels of the initial image captured by the image sensor region 910. Accordingly, the camera system can select luminance information for a pixel of a final image corresponding to the light source from the initial image captured by the image sensor region 920 over the initial image captured by the image sensor region 910. The camera system can similarly select luminance information for each pixel of the final image, and can combined selected luminance information with chrominance information retrieved from the initial images to form the final image.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A multi-lens camera system, comprising:
   one or more image sensors, collectively comprising a plurality of image sensor regions;
   a plurality of lenses coupled to the one or more image sensors, wherein:
      each lens of the plurality of lenses is adapted to capture light from a scene and direct the light onto at least one of the plurality of image sensor regions in order to form a respective initial image, collectively forming a plurality of initial images,
      each of the plurality of initial images comprises a plurality of pixels, and
      each pixel comprises luminance information;
   a controller coupled to the one or more image sensors and adapted to execute instructions to cause the controller to:
      compare the luminance information for one or more pixels in a first one of the plurality of initial images to the luminance information for a corresponding one or more pixels in a second one or more of the plurality of initial images;
      select for use, for each of the one or more pixels, luminance information from either the first initial image or one of the second one or more initial images, wherein the selection of which initial image to use luminance information from is based, at least in part, on the comparing; and
      generate a combined luminance image using the selected luminance information for the one or more pixels.

2. The multi-lens camera system of claim 1, wherein the luminance information selected for use for the one or more pixels comes from at least two different initial images.

3. The multi-lens camera system of claim 1, wherein the selected luminance information for one of the one or more pixels corresponds to a dark area of the combined luminance image, and wherein the selected luminance information for the one of the one or more pixels corresponding to the dark area is from a first initial image captured by a first one of the plurality of lenses that is adapted with a broader spectral filter than one or more of the other lenses of the plurality of lenses.

4. The multi-lens camera system of claim 1, wherein the selected luminance information for one of the one or more pixels corresponds to a light area of the combined luminance image, and wherein the selected luminance information for the one of the one or more pixels corresponding to the light area is from a first initial image captured by a first one of the plurality of lenses that is adapted with a spectral filter that is not as broad as one or more of the other lenses of the plurality of lenses.

5. The multi-lens camera system of claim 1, wherein the controller is further adapted to select luminance information for use based, at least in part, on a sharpness value of a pixel in an initial image.

6. The multi-lens camera system of claim 1, wherein the controller is further adapted to select chrominance information from one or more of the initial images for use to form a combined chrominance image.

7. The multi-lens camera system of claim 6, wherein the controller is further adapted combine the combined chrominance image and the combined luminance image to form a final image.

8. The multi-lens camera system of claim 1, wherein the controller is further adapted to execute instructions to cause the controller to perform edge detection on one or more of the plurality of initial images, and wherein the instructions to select further comprise instructions to select which initial image to use luminance information from based, at least in part, on the performed edge detection.

9. A method for capturing an image by a multi-lens camera system, comprising:
   capturing light from a scene using a plurality of lenses;
   directing the captured light onto a plurality of image sensor regions to form a plurality of initial images, wherein each initial image comprises a plurality of pixels representative of light captured by a first lens of the plurality of lenses, and wherein each pixel comprises luminance information;
   comparing the luminance information of one or more pixels of a first one of the initial images from the plurality of initial images to the luminance information of a corresponding one or more pixels from one or more other initial images of the plurality of initial images;
   for each of the one or more pixels, selecting luminance information for the respective pixel from the corresponding pixel of one of: the first one of the initial images or the one or more other initial images based, at least in part, on the comparing; and
   combining the selected luminance information of the one or more pixels to form a combined luminance image.

10. The method of claim 9, wherein the luminance information selected for use for the one or more pixels comes from at least two different initial images.

11. The method of claim 9, wherein the selected luminance information for one of the one or more pixels corresponds to a dark area of the combined luminance image, and wherein the selected luminance information for the one of the one or more pixels corresponding to the dark area is from a first initial image captured by a first one of the plurality of lenses that is adapted with a broader spectral filter than one or more of the other lenses of the plurality of lenses.

12. The method of claim 9, wherein the act of selecting luminance information for a respective one of the one of pixels is based, at least in part, on a sharpness value of the pixel in an initial image.

13. The method of claim 9, further comprising:
selecting chrominance information from one or more of the initial images for use to form a combined chrominance image; and
combining the combined chrominance image and the combined luminance image to form a final image.

14. The method of claim 9, further comprising performing edge detection on one or more of the plurality of initial images, and wherein the act of selecting luminance information further comprises selecting which initial image to use luminance information from based, at least in part, on the performed edge detection.

15. An apparatus, comprising:
one or more image sensors comprising a plurality of image sensor regions;
a first lens coupled to the one or more image sensors and adapted to capture light from a scene and direct the light onto a first image sensor region to form a first initial image that includes a plurality of first pixels, wherein each of the first pixels comprises luminance information;
a second lens coupled to the one or more image sensors and adapted to capture light from a scene and direct the light onto a second image sensor region to form a second initial image that includes a plurality of second pixels, wherein each of the second pixels comprises luminance information; and
a controller coupled to the one or more image sensors and adapted to execute instructions to cause the controller to:
perform a pixel level selection of luminance information for each of a plurality of third pixels of a luminance image by comparing luminance information for each of the first pixels of the first initial image to a corresponding second pixel of the second initial image,
wherein the pixel level selection comprises selecting a source of luminance information for each third pixel to be either the first initial image or the second initial image based, at least in part, upon the comparison of luminance information from the first initial image and luminance information from the second initial image; and
combine the selected luminance information for each third pixel to form a combined luminance image.

16. The apparatus of claim 15, wherein the source of luminance information for a first one of the plurality of third pixels is the first initial image, and wherein the source of luminance information for a second one of the plurality of third pixels is the second initial image.

17. The apparatus of claim 15, wherein the selected luminance information for one of the plurality of third pixels corresponds to a dark area of the combined luminance image, and wherein the selected luminance information for the one of the third plurality of pixels corresponding to the dark area is from the first initial image captured by the first lens, and wherein the first lens is adapted with a broader spectral filter than the second lens.

18. The apparatus of claim 15, wherein the instructions to select a source of luminance information for a respective one of the plurality of third pixels is based, at least in part, on a sharpness value of the pixel in the first initial image and a sharpness value of the pixel in the second initial image.

19. The apparatus of claim 15, wherein the controller is further adapted to execute instructions to cause the controller to:
select chrominance information from the first initial image and the second initial image for use to form a combined chrominance image; and
combine the combined chrominance image and the combined luminance image to form a final image.

20. The apparatus of claim 15, wherein the controller is further adapted to execute instructions to cause the controller to:
perform edge detection on one or more of the plurality of initial images,
wherein the instructions to select a source of luminance information further comprise instructions to select a source of luminance information based, at least in part, on the performed edge detection.

* * * * *